United States Patent
Foos et al.

(10) Patent No.: US 7,386,155 B2
(45) Date of Patent: Jun. 10, 2008

(54) TRANSFORMING VISUAL PREFERENCE TERMINOLOGY FOR RADIOGRAPHIC IMAGES

(75) Inventors: David H. Foos, Rochester, NY (US); Mary E. Couwenhoven, Fairport, NY (US); Robert A. Senn, Pittsford, NY (US)

(73) Assignee: Carestream Health, Inc., Rochester, NY (US)

( * ) Notice: Subject to any disclaimer, the term of this patent is extended or adjusted under 35 U.S.C. 154(b) by 565 days.

(21) Appl. No.: 10/994,719

(22) Filed: Nov. 22, 2004

(65) Prior Publication Data

US 2006/0110020 A1    May 25, 2006

(51) Int. Cl.
*G06K 9/00* (2006.01)

(52) U.S. Cl. .................. 382/128; 382/132; 250/390.02

(58) Field of Classification Search ................ 382/128, 382/129, 130, 131, 132, 133, 134; 250/390.02, 250/318, 370.08, 582, 584; 715/529; 378/62, 378/63, 87, 98.7, 98.8, 98.11, 98.12; 128/920
See application file for complete search history.

(56) References Cited

U.S. PATENT DOCUMENTS 6,175,643 B1 *   1/2001   Lai et al. .................... 382/131
6,195,474 B1 *   2/2001   Snyder et al. .............. 382/312
6,418,237 B1 *   7/2002   Takeo ......................... 382/128
6,701,011 B1 *   3/2004   Nakajima .................... 382/167
2002/0171852 A1  11/2002  Zhang et al.

FOREIGN PATENT DOCUMENTS

EP         0 599 092       2/1996

OTHER PUBLICATIONS

Mary Couwenhoven et al., Enhancement Method That Provides Direct and Independent Control of Fundamental Attributes of Image Quality for Radiographic Imagery, Medical Imaging -2004, Proc. of SPIE, vol. 5367, pp. 474-481.

* cited by examiner

*Primary Examiner*—Abolfazl Tabatabai

(57) ABSTRACT

A method for transforming visual preference terminology into a set of fundamental image-quality attributes, and using these attributes to produce a display ready radiographic image that meets the desired appearance. The visual preference terminology can be specified in a hierarchical structure providing a flexible and configurable interface to a radiographic system.

13 Claims, 4 Drawing Sheets

TRANSFORMING VISUAL PREFERENCE TERMINOLOGY FOR RADIOGRAPHIC IMAGES

FIELD OF THE INVENTION

This present invention generally relates to digital radiography, and in particular, to a method which enables a user to adjust image appearance for computed radiography (CR) and digital radiography (DR).

BACKGROUND OF THE INVENTION

It is a common desire to enhance images acquired from imaging devices to improve their image quality. Digital radiographic (x-ray) imaging systems capture images that have digital code values that typically represent either linear or log exposure. Image processing algorithms are employed to convert (or render) the raw capture pixel data into a display or print ready form.

It is common for a digital radiographic imaging system to require that the body part and projection information (exam-type) of the image be known prior to processing the image for display. Often these systems require that the user (e.g. a radiologist or radiographic technologist) manually enter this information into the system. This can be a burden to the user and may impact workflow. In addition, if there is an error in the entry, it can result in a sub-optimal presentation of the image requiring the user to reprocess the image with the correct exam-type information or manually adjust the image processing parameters.

Manually setting the image processing parameters for conventional image processing to achieve a desired appearance can often be a formidable task for radiographic system user. The parameter adjustments are often expressed in image science terms that the user is unfamiliar with and often the adjustment of one parameter can affect the appearance of more than one image quality attribute. To achieve the desired image appearance it often requires iteration and requires the user to be highly trained. Often users will resort to simplified look-up-table adjustments (know to those skilled in the art as window/level) to adjust the appearance of the image. This provides a very limited control and often provides sub-optimal results.

Because defining the image processing parameters on a typical radiographic system is a complicated process, users will settle with a very limited selection of looks for their images. For example, a specific body part and projection may be acquired for multiple diagnostic purposes, but in many radiographic systems the image processing is the same independent of diagnostic purpose.

Accordingly, there exists a need for a method and system that automatically processes an image to a desired visual preference.

The present invention provides a method and system for automatically processes an image to a desired visual preference.

SUMMARY OF THE INVENTION

An object of the present invention is to provide a method which enables a user to adjust image appearance for computed radiography (CR) and digital radiography (DR) interact with image processing algorithms.

Another object of the present invention is to provide an interface for a user to interact with image processing algorithms to adjust image appearance for computed radiography (CR) and flat panel digital radiography (DR).

A further object of the present invention is to provide a method to process a radiographic image to a desired visual preference (aim appearance) without requiring the user to manually enter exam-type information.

Yet a further object of the present invention is to provide a method to specify and select visual preferences in a flexible, configurable and hierarchical manner.

Still yet another object of the present invention is to provide a method to define new visual preferences by biasing fundamental image quality attributes that are, to a first order, orthogonal.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

The system is configured to transform visual preference terminology into a set image quality descriptors that directly and independently control fundamental attributes of image quality (e.g. brightness, latitude, contrast, sharpness, and noise), providing an intuitive way to adjust the image appearance and to define new visual preferences as desired. The system of the present invention provides a flexible and configurable user interface that allows one to readily navigate and manage the visual preference selection is also desired.

According to the present invention there is provided a method to interface to conventional radiographic image processing systems by specifying a visual preference and transforming the visual preference terminology into fundamental image quality attributes that are used by the image processing functions to produce a radiographic image that has the desired appearance without requiring the user to manually enter exam-type information.

According to the present invention there is a method to interface to a radiographic image processing system, via a flexible and configurable hierarchical structure, to specify and select visual preferences. A visual preference can be specified/selected for all images at the top layer, visual preferences can be specified/selected for logical groupings on the mid-tier layers, and visual preferences can be specified/selected for an individual image on the lowest layer.

According to the present invention there is a method to generate new visual preferences by biasing the individual image quality attributes.

According to one aspect of the present invention there is provided a method of processing a digital medical image. The method includes the steps of: accessing the digital medical image; allowing a user to select a visual preference; mapping the selected visual preference to the accessed digital image to generate a processed digital medical image; and displaying, transmitting, or printing the processed digital medical image. In a preferred embodiment, the step of mapping includes the steps of: determining an exam-type probability; accessing a first prediction model corresponding to the selected visual preference; calculating a second prediction model using the first prediction model and the exam-type probability; extracting features from the accessed digital medical image; using the extracted features to generate image quality attributes; and using the image quality attributes to generate a processed digital medical image.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE PREFERRED EMBODIMENTS

Figure 1:
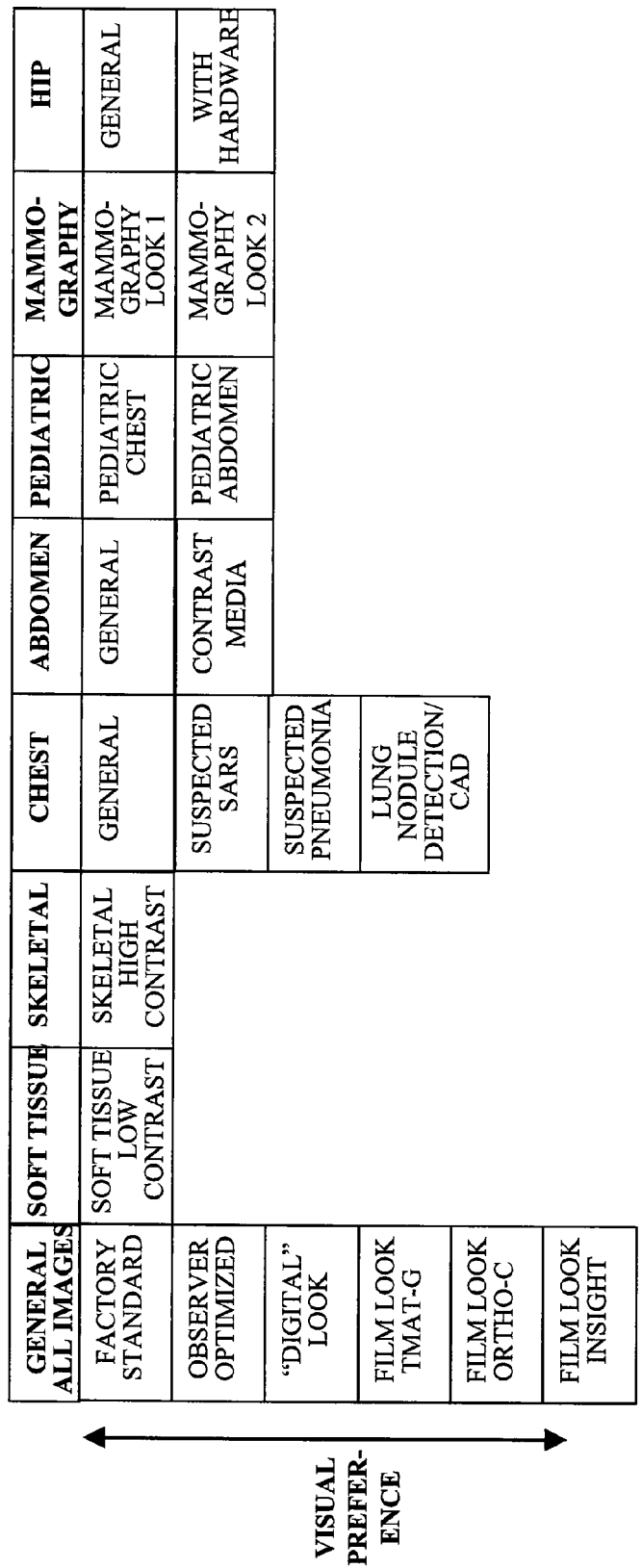
FIG. 1 is an illustration showing an example hierarchical structure of visual preferences.

The following is a detailed description of the preferred embodiments of the invention, reference being made to the drawings in which the same reference numerals identify the same elements of structure in each of the several figures.

The present invention is directed to a method for transforming visual preference terminology for radiographic image appearance into fundamental image quality attributes. The present invention generally relates to digital radiography, and in particular, to a method that enables a configurable, flexible, and intuitive interface for a technologist to interact with image processing algorithms to adjust image appearance for computed radiography (CR) and digital radiography (DR).

A visual preference is the terminology that is used to describe a desired image look. The specification of visual preferences can be structured in a hierarchical fashion. A visual preference can be specified for all images at the top layer, for logical groupings on the mid-tier layers, and for an individual image on the lowest layer. An important benefit enabled by this invention is the ability to express visual preferences for digital radiography using a variety of terminology, enabling a flexible, configurable, and hierarchical user interface on a computed radiography operator console.

Referring to FIG. 1, visual preferences can be defined for groups of images. For example, group categories can be: 1) all images, 2) logical clustering of images, for example: soft tissue, skeletal, pediatric, specific diseases, specific body parts and projections, images from a particular patient study (e.g. images processed with the same look for monitoring patient progress), and the like, or 3) an individual image.

Departments within institutions (e.g. orthopedic, emergency room, intensive care, and the like) can customize their hierarchical structure of visual preferences to best meet their needs.

For a particular visual preference, an aim appearance (or desired visual appearance; a look) is defined for 1) all images, 2) each logical cluster of images, or 3) individual image characteristics. An aim appearance can be mathematically described and represented by a vector of image quality attributes, $\bar{A}$. Image quality attributes are used to derive parameters for conventional image processing functions (e.g., tone scale, unsharp masking, and dynamic range compression). The image processing functions are used to transform raw captured digital radiographic images into optical density space (such as for output to hardcopy display) or into luminance space (such as for display on a cathode ray tube or a flat panel) with a displayed image appearance that matches the desired appearance.

Image quality attributes are defined such that they are intuitive to an expert observer (e.g., radiologist, radiographic technologist, etc.). Also, the effect on the image appearance of each attribute is, to a first order, orthogonal. An aim appearance can be a look defined by an expert observer by dialing in-settings for each of the image quality attributes. An aim appearance can also be a look produced by a system, e.g., a film system, or another digital radiography system. In the present invention, a parameter translation is employed to establish the values for the image quality attributes that represents to a first order the desired visual appearance.

In a preferred embodiment of the present invention, there are five particular attributes of image quality: brightness, global contrast (or inversely latitude), detail contrast, sharpness of small detail, and sharpness of fine detail (reducing sharpness (or blurring) of fine detail can be used to control the appearance of noise).

The brightness sets the preferred density for a selected exposure region in an image (e.g. the lung fields in a chest radiograph).

The global contrast defines the range of exposures that are uniquely rendered to the display space (e.g. density or luminance). A low global contrast (wide latitude or low dynamic range) rendering implies that a large exposure range is uniquely mapped to display space. Conversely a high global contrast (narrow latitude or high dynamic range) rendering implies that a narrow exposure range is uniquely mapped to display space. The medium sized structures in an image are represented by the mid frequency range in the image. Amplifying these frequencies increases the detail contrast of these structures while suppressing these frequencies lowers the detail contrast (or creates a flatter looking image).

The sharpness defines the local contrast of small structures (or mid to high frequencies) in the image. Amplifying these frequencies increases the sharpness of the image while suppressing these frequencies decreases the sharpness (creating a blurry image). Noise is a very fine detail structure (represented by the highest frequencies) in the image and it is artificial. Amplifying these frequencies may increase the appearance of noise while suppressing them reduces the appearance of noise in the image.

The specific definitions and mathematical functions for each of these image quality attributes are disclosed in commonly assigned U.S. Ser. No. 10/625,964 titled "METHOD FOR RENDERING DIGITAL RADIOGRAPHIC IMAGES FOR DISPLAY BASED ON INDEPENDENT CONTROL OF FUNDAMENTAL IMAGE QUALITY PARAMETERS", filed on Jul. 24, 2003, incorporated herein by reference.

Each of the attributes can be mathematically dependent upon other parameters such as density, luminance, exposure, or the like. The fundamental nature of these attributes provides for a variety of x-ray film appearances as well as a variety of digital radiographic appearances to be approximately described (represented) as an image quality attribute vector. It will be recognized by those skilled in the art that other attributes can be defined to control the appearance of a radiographic image.

In the present invention, prediction models are employed to automatically determine image quality attributes that will produce a radiographic image that has the aim (i.e., desired) appearance defined by a particular visual preference.

For each image quality attribute, a prediction model is built. The prediction models can be represented as a vector of models, $\hat{M}$. The prediction models can be built by a trainable system (e.g. neural network). A type of system used to build the model is not fundamental to this invention.

The models can be linear or non-linear. In one embodiment a linear model is used and is composed of a constant bias term and a set of coefficients that are used to weight specific features that are extracted from the image (e.g., extracted from histogram analysis). The type and number of features that are extracted from the image depends on the visual preference selected. The exact features that are calculated are not fundamental to this invention.

For each visual preference, prediction models are built for each exam-type, $\hat{M}_{examType}$. Exam-type is used to categorize the types of images collected by a radiographic system. In a preferred embodiment of this invention exam-type is defined as the body part and projection of a radiographic image (e.g. Chest, Lateral View, and the like). It will be recognized by those skilled in the art that other useful definitions for exam-type can be used. For example, another useful definition for exam-type is body part, projection, and purpose of the exam (e.g. Abdomen, lateral view, and contrast study).

In the present invention, the contribution of each exam-type dependent prediction models, $\hat{M}_{examType}$, to the calculation of the final image quality attributes, $\hat{A}$, is weighted by the probability that the input radiographic image is that exam-type, $P_{examtype}$. The sum of probabilities across all exam-types is equal to 1.0. In a preferred embodiment, the exam-type probability can be determined 1) automatically by means of an image analysis (e.g. an exam-type classifier), 2) by a user at the operator console, or 3) from other parts of a radiographic system (e.g. Health Care Information System, Radiology Information System, site collection statistics, procedure codes, or the like).

An example of a suitable exam-type classifier is described in commonly assigned U.S. Ser. No. 11/285,568 titled "AUTOMATED RADIOGRAPH CLASSIFICATION USING ANATOMY INFORMATION" filed on Nov. 11, 2005, in the name of Luo et al., incorporated herein by reference. Other suitable classifiers are known to those skilled in the art.

Figure 2:
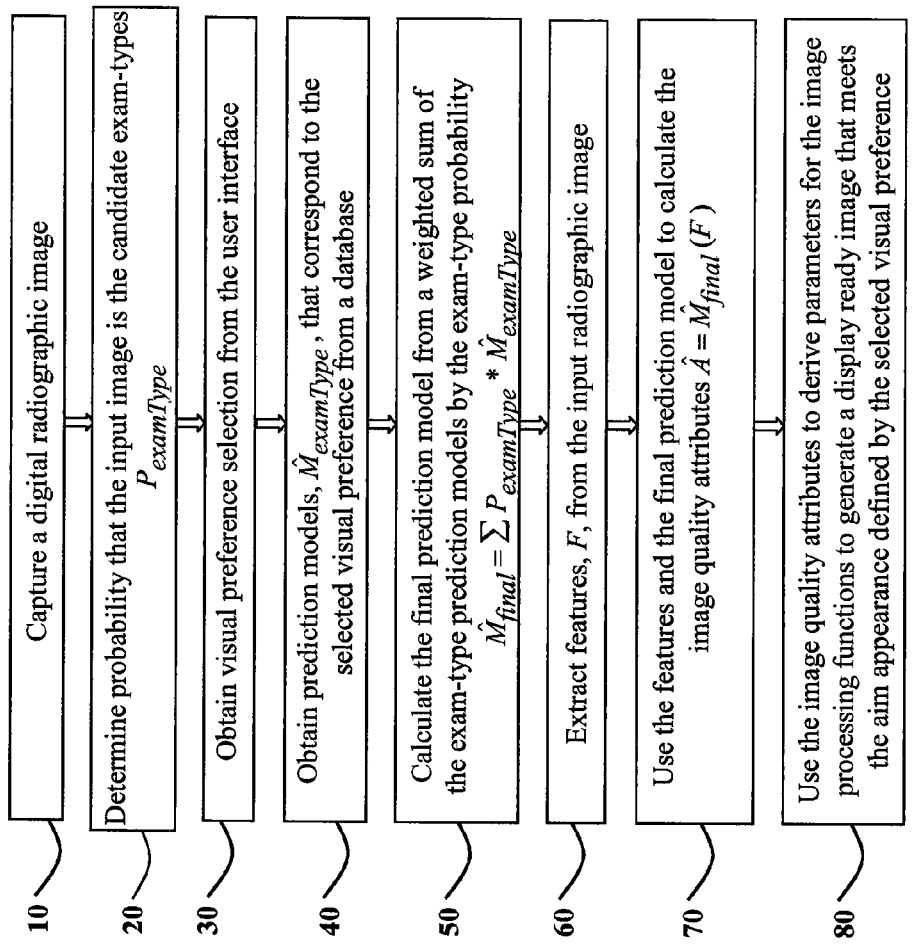
FIG. 2 is a flow diagram of the method in accordance with the present invention.
Figure 3:
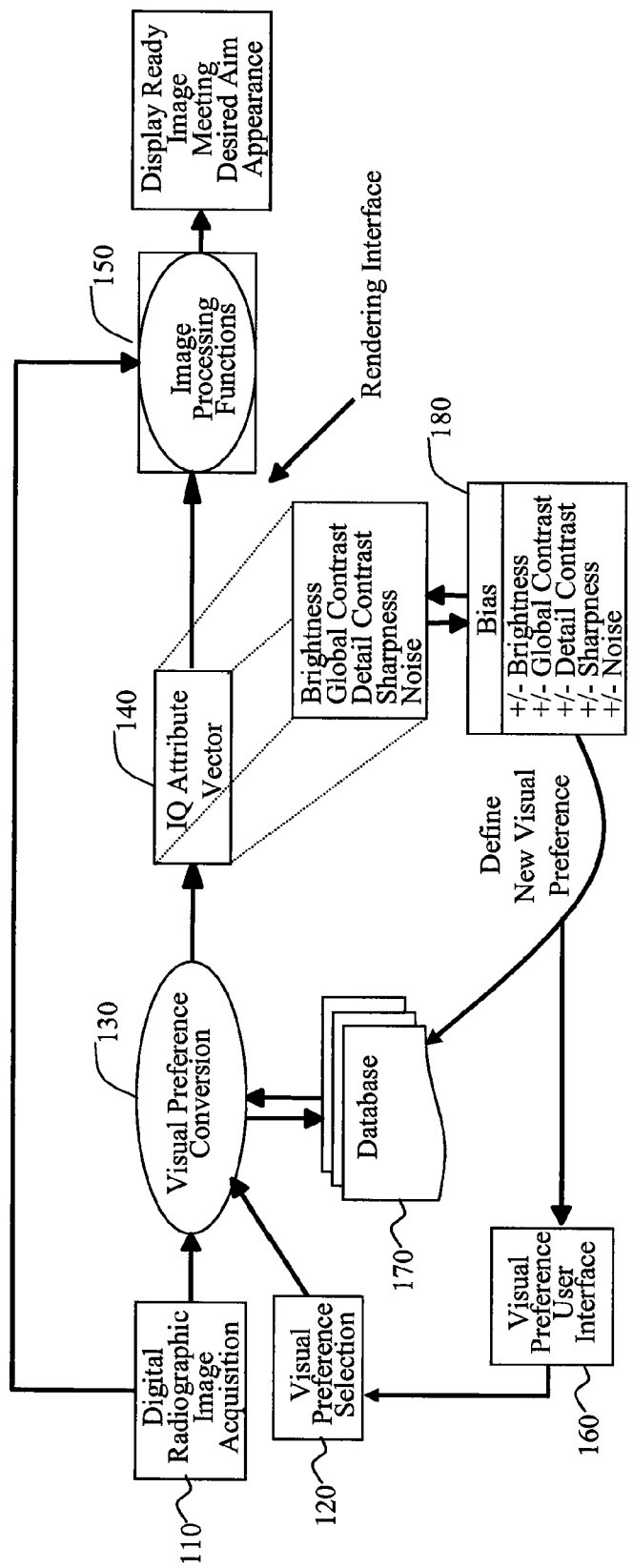
FIG. 3 is a schematic diagram of a system suitable to practice the method of FIG. 2.

Referring now to FIGS. 2 and 3, there is shown a flow diagram of the method in accordance with the present invention and a system suitable to practice the method.

In step 10, a digital image, in which code values represents $\log_{10}$ exposure or linear exposure, is captured using an image acquisition unit 110. Unit 110 can be for example, a medical image acquisition unit such as a computed radiography or direct digital radiography unit, an x-ray film digitizer, or the like. Other digital image acquisition units can be employed.

An exam-type probability, $P_{examtype}$, is determined (step 20) by a system. A system user (e.g., radiologist or a radiographic technologist) selects a desired visual preference (step 30) using a system having a suitable user interface 160. Prediction models, $\hat{M}_{examType}$, are obtained from a database 170 for a selected visual preference 120 (step 40). The contribution of the exam-type prediction models, to the calculation of the final model, $\hat{M}_{final}$, is weighted-by the exam-type probability (step 50). Features, $\hat{F}$, are extracted from the radiographic image (step 60) and input into the final model to calculate the image quality attributes (step 70). Finally, the image quality attributes are provided to the image processing functions 150 to generate a display ready image that meets the desired aim appearance (step 80).

At the user interface of the system, a method is provided to bias the individual image quality attributes to change the appearance of an image. The biases can be applied directly to the predicted attributes for a single image that is rendered directly to display, or stored in a database as biases to existing prediction models. The biased models can be referenced by a new visual preference that is available for future processing. The user can re-configure the user interface to include the new visual preference as part of the visual preference selection hierarchy.

In a preferred embodiment of the present invention, there is a method that enables a user to readily obtain (e.g., touchscreen, cross-hairs, mouse over the selection button of interest) at the operator console a textual description (e.g., a call-out) of a particular visual preference, and further provides example images for a user to view that are processed to meet the visual preference of interest.

Figure 4:
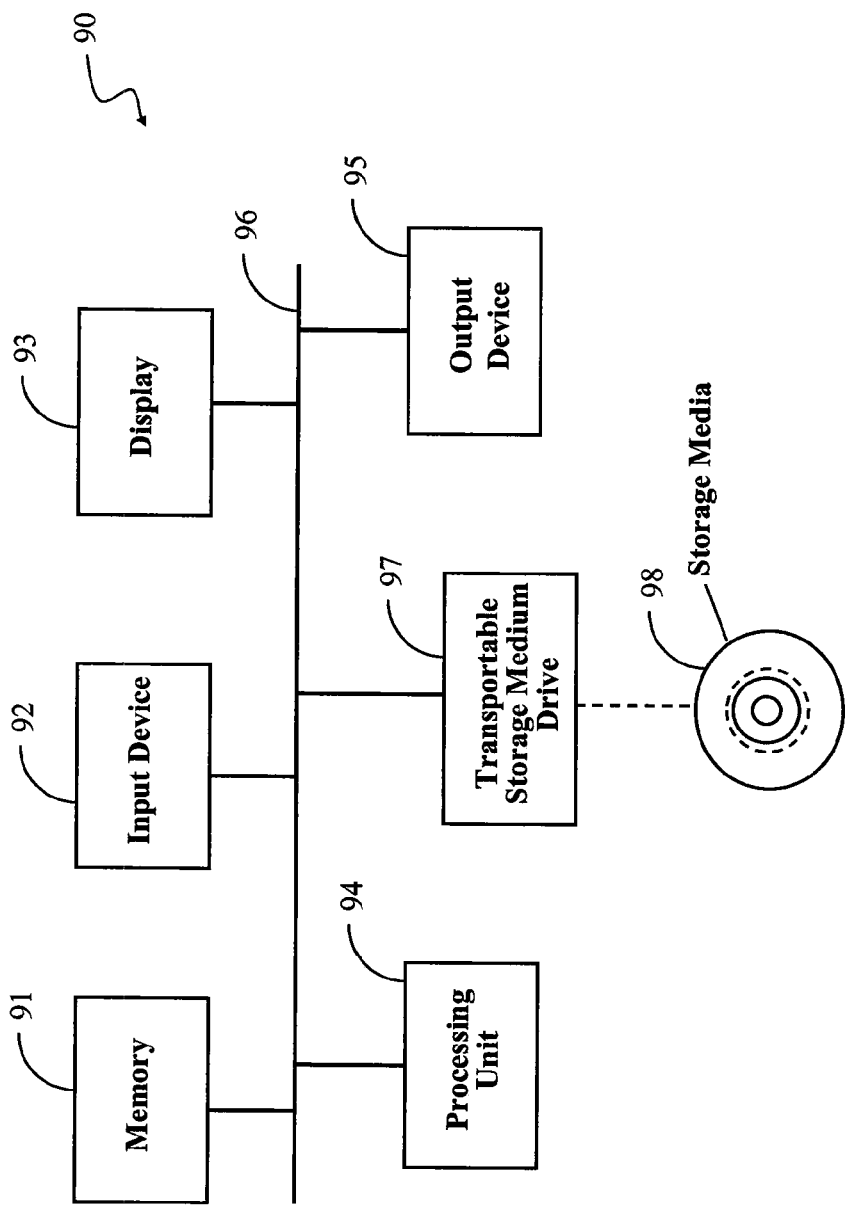
FIG. 4 is a block diagram of a system suitable for the method in accordance with the present invention.

Referring now to FIG. 4, there is shown a digital computer 90 for carrying out the present invention. Digital computer 90 includes a memory 91 for storing digital images, application programs, operating systems, and the like. Memory 91 can include mass memory (such as hard magnetic disc or CD ROM), and fast access memory (such as RAM). Computer 90 also includes input devices 92 (such as keyboard, mouse, touch screen, and the like), a control device/console 93 (CRT, Flat Panel Display, and the like), a central processing unit 94, an output device 95 (such as a CRT, Flat Panel, thermal printer, laser printer, network communication, and the like). Components 91, 92, 93, 94, and 95 are connected together by communication member such as a control/data bus 96. Computer 90 can include a transportable storage medium drive 97 for reading from and/or writing to transportable storage media 98, such as DVD or CD.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST 10 image acquisition unit
20 determine exam-type probability
30 select visual preference
40 obtain exam-type prediction models
50 calculate final prediction model
60 extract features from the image
70 calculate image quality attributes
80 generate display ready image that meets the aim appearance
90 computer
91 memory
92 input device
93 display
94 processing unit 95 output device
96 control/data bus
97 transportable storage medium
98 storage media

What is claimed is:

1. A method of processing a digital medical image, comprising:

determining an exam-type probability corresponding to the digital medical image;

accessing a first prediction model corresponding to a selected visual preference;

calculating a second prediction model using the first prediction model and the exam-type probability;

determining a plurality of image quality attributes based on at least the second prediction model; and generating a processed digital medical image based on the plurality of image quality attributes.

2. The method of claim 1, wherein the first prediction model is obtained from a database.

3. The method of claim 1, wherein the exam-type probability corresponds to a probability of 1) body part and 2) projection of the digital medical image.

4. The method of claim 1, wherein the exam-type probability corresponds to a probability of 1) body part, 2) projection, and 3) examination purpose of the digital medical image.

5. The method of claim 1, wherein the second prediction model comprises a weighted sum of the first prediction model and the exam-type probability.

6. The method of claim 1, further including generating the plurality of image quality attributes based on a plurality of features extracted from the digital medical image.

7. The method of claim 6, wherein the type and number of the plurality of features extracted are based on the selected visual preference.

8. The method of claim 1, wherein a distinct prediction model is generated for each image quality attribute of the plurality of image quality attributes.

9. The method of claim 1, wherein the plurality of image quality attributes comprises at least one of brightness, global contrast, detail contrast, and sharpness.

10. A method of processing a digital medical image, comprising:

determining an exam-type probability corresponding to the digital medical image;

accessing a first prediction model corresponding to a selected visual preference;

calculating a second prediction model using the first prediction model and the exam-type probability;

determining image quality attributes representative of the selected visual preference;

generating a processed digital medical image based on the image quality attributes; and displaying, transmitting, or printing the processed digital medical image.

11. A method of processing a digital medical image, comprising the steps of:

accessing the digital medical image;

allowing a user to select a visual preference;

determining an exam-type probability;

accessing a first prediction model corresponding to the selected visual preference;

determining a second prediction model using the first prediction model and the exam-type probability;

extracting features from the accessed digital medical image;

using the extracted features and the second prediction model to generate image quality attributes; and using the image quality attributes to generate a processed digital medical image.

12. The method of claim 11, further comprising the step of displaying, transmitting, or printing the processed digital medical image.

13. computer-readable medium encoded with computer-executable instructions to perform the method of claim 11.

* * * * *